3,010,964
COMPOSITIONS AND PROCESS FOR INHIBITING THE POLYMERIZATION OF VINYL HETEROCYCLIC NITROGEN COMPOUNDS
Adriano Nenz and Giovanni B. Gechele, Milan, Italy, assignors to Sicedison S.p.A., Milan, Italy
No Drawing. Filed Dec. 30, 1959, Ser. No. 862,803
Claims priority, application Italy Jan. 9, 1959
9 Claims. (Cl. 260—290)

The present invention relates to a process for inhibiting the polymerization of polymerizable basic nitrogenous heterocyclic vinyl compounds in general and more particularly vinyl-pyridines, vinyl-quinolines, and vinyl-isoquinolines.

There are known polymerizable monomers of the type of the vinyl-pyridines, that find a large use in the plastic materials industry, especially in the co-polymerization with other monomers, such as for instance butadiene or acrylonitrile.

By the term "vinyl-pyridines" there are to be understood monomers of the following general formula:

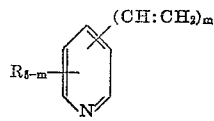

wherein R represents the alkyl radicals (generally methyl or ethyl), and $m$ stands for the numerals 1 or 2. Among the best known vinyl-pyridines that are commercially used, there can be cited for example the 2-, 3-, and 4-vinyl-pyridines, the 5-ethyl-2-vinyl-pyridines, the 2-methyl-5-vinyl-pyridines.

There are also known nitrogenous heterocyclic monomers, containing one or more vinyl groups, such as for instance vinyl-quinolines, methyl-vinyl-quinolines, ethyl-vinyl-quinolines, variously substituted vinyl-isoquinolines, vinyl-piperidines, N-vinyl-carbazoles, N-vinyl-pyrrolidones.

The compounds mentioned above, and particularly the vinyl-pyridines, have a marked tendency to polymerize spontaneously, much more readily than that of other vinyl monomers, such as for instance styrene. There are met therefore particular difficulties both in the storage and distillation, and in general in all the operations wherein these products are exposed to high temperatures.

There are known two types of polymers of the vinyl-pyridines. One of these is a very viscuous product, soluble in the monomer and in many other solvents. The other one is hard, brittle, and insoluble in the monomer and in all solvents, and having a highly latticed structure; it is commonly called "pop-corn" and is quite often formed inside the columns for the distillation of the monomer; it has the particular property of spontaneously accumulating if exposed to the presence of fresh monomer, increasing its weight, under experimental conditions, even a hundred or thousand fold. There thus arises the problem of finding some particular substances that will be capable of stopping the development of such undesirable phenomena.

It is an object of the present invention to find new substances capable of inhibiting the polymerization of vinyl-pyridines, vinyl-quinolines and vinyl-isoquinolines.

A further object is that of finding a stabilizing agent that will be effective in small concentrations relative to the nitrogenous heterocyclic vinyl monomer present.

Still another object is that of providing compositions containing, or consisting of the nitrogenous heterocyclic vinyl compounds, effectively stabilized, that may be subjected to thermic treatments even at high temperatures, without incurring the formation of undesirable quantities of polymer.

Other objects of the present invention will become apparent from the following description and examples.

The substance having an inhibiting action over the polymerization of the vinyl-pyridines and vinyl-quinolines, according to the present invention, belongs to the group of the sulphonphthaleines, which are compounds of the type:

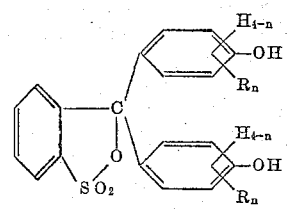

where R may be a nitric, halogen, phenolic, amine, sulphuric, or cyanide group, and $n$ is a numeral that may vary from 0 to 4 inclusive.

It has been ascertained that compounds of this class have the property of inhibiting the growth of both types of the above mentioned polymers; they are however particularly fitted for all operations wherein the monomer is being heated to high temperatures (distillation etc.). It is indeed known that many inhibitors called "storage inhibitors," such as for instance the para-tertiary-butyl-catechol, and the phenols at large, lose remarkably their effectiveness even at a temperature not much above the normal storage temperature.

The inhibitors according to the present invention instead maintain these qualities even within a wide range of temperatures, and are particularly and equally effective both as storage inhibitors, and as distillation inhibitors.

An example of a compound belonging to the sulphonphthaleine group, having this property of inhibiting the polymerization of nitrogenous heterocyclic vinyl compounds is the unsubstituted sulphonphthaleine, commonly called phenol red.

In respect to the amount of inhibiting agent to be added to the vinyl-pyridines, this amount cannot be fixed a priori, since it depends on several factors, such as for instance the type of vinyl-pyridine (2-vinyl-pyridine, 4-vinyl-pyridine, 2-methyl-5-vinyl-pyridine, etc.) and the particular use required (storage or distillation).

Those skilled in this art can easily determine for every instance, experimentally, the inhibiting agent concentration required to prevent the formation of undesirable quantities of polymer.

Said concentration therefore, in weight, relative to the weight of the nitrogenous heterocyclic vinyl-compounds, may vary from 0.001% up to 5%, preferably from 0.005% to 1%. Higher concentrations (10% or more) would be operative, but often prove to be undesirable for all practical purposes.

The inhibiting agent may be added to the pure vinyl-pyridine as well as to the vinyl-pyridine mixed with water or other organic substances. There is well known for instance the importance of the separation process for the vinyl-pyridines from the alkyl-pyridines by means of distillation; in the liquid system feeding the column there are present water, vinyl-pyridine, ethyl-pyridine, and other pyridic compounds, and there is directly added to the mixture an inhibiting agent in the suitable ratio.

Although the inhibiting agent may be mixed with the vinyl-pyridine in any way whatever, it has been ascertained that it is preferable to establish conditions favorable to secure the maximum possible solubility. Thus for instance it has been found that it is expedient to introduce the inhibitor in the finest possible form, with stirring and eventually heating.

The present invention will now be further explained by examples, it being understood that the examples have merely an illustrative and not a limiting value, as will be understood by those skilled in this art.

EXAMPLE NO. 1

There are taken 10 gr. of 2-methyl-5-vinyl-pyridine carefully purified, by means of repeated crystallizations, and same is introduced into a sturdy glass vial; to this is added a weighed amount of inhibiting agent. The vial is then subjected to a freezing temperature of −40 to −50° C. and repeatedly subjected to a vacuum of 1 to 2 mms. of Hg. The vial is then sealed, taking care that the vacuum remains unaffected, and introduced into an oil bath at 100° C. wherein the contents are kept stirred by means of a suitable apparatus, for a length of time of 10 hours. At the end of this period the vial is rapidly cooled and its contents poured, a drop at a time, into one liter of hexane, with moderate stirring. The polymer is thus slowly precipitated and then filtered through a 1–G4 Gooch funnel, fully leached, dried in an oven at 70° C. under vacuum, and weighed.

In the attached tables there are listed the percentages by weight of polymer, as obtained with different inhibiting agents known or used in the industry, and compared with that obtained with the phenol red, as an example of sulphonphthaleine.

*Table I*

| Inhibiting Agent | Concentration, grams per hundred | Polymer percentage |
|---|---|---|
|  |  | 28 |
| Phenol Red (sulphonphthaleine) | 0.2 | 0.8 |
| Picric Acid | 0.2 | 4.8 |
| Pyrogallol | 0.2 | 22.8 |
| Methylene Blue | 0.2 | 16 |
| Alpha-nitrous-beta-naphthol | 0.2 | 8.0 |
| Para-tertiary-butyl-catechol (T.B.C.) | 0.2 | 18.0 |

EXAMPLE NO. 2

The same experimental procedure described in the preceding example, was followed with the inhibitors and the quantities of same listed in Table II where the obtained results are also shown.

*Table II*

| Inhibitor | Concentration, grams per hundred | Polymer percentage |
|---|---|---|
| Sulphur | 0.2 | 7.6 |
| Sulphur | 0.4 | 3.4 |
| Phenol Red (sulphonphthaleine) | 0.1 | 2.8 |
| Phenol Red | 0.2 | 0.8 |
| Phenol Red | 0.4 | 0.7 |

What we claim is:

1. A process for inhibiting the polymerization of polymerizable basic nitrogenous heterocyclic vinyl compounds having the formula selected from the group consisting of:

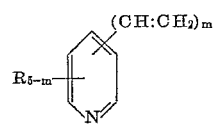

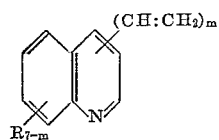

and

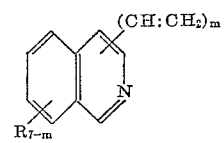

where $m$ is a numeral ranging from 1 to 2, and where R is a member selected from the group consisting of H and lower alkyl, said process consisting in addition to said heterocyclic vinyl compounds, as a stabilizing agent, a sulphonphthaleine having the formula:

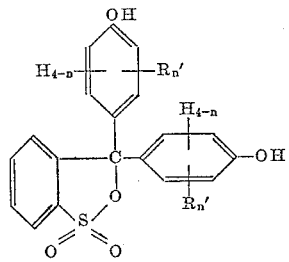

where R′ is a substituent selected from the group consisting of nitro, halo, hydroxyl, amino, cyano, and sulpho, and $n$ is a numeral ranging from 0 to 4, inclusive.

2. A process for inhibiting the polymerization of vinyl heterocyclic nitrogenous basic compounds according to claim 1, in which said stabilizing agent is:

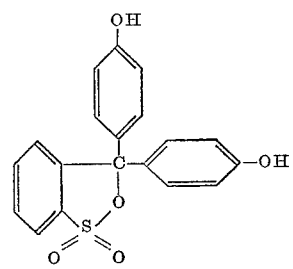

3. A process according to claim 1, wherein said stabilizing agent is added to said basic nitrogenous heterocyclic vinyl compounds during heating of said vinyl compounds to temperatures ranging from the melting point thereof up to the boiling temperature thereof.

4. A process according to claim 1, wherein, said stabilizing agent is added to said basic nitrogenous heterocyclic vinyl compounds at temperatures normally prevailing during storage thereof.

5. A composition consisting essentially of a normally polymerizable basic nitrogenous heterocyclic compound having the formula selected from the group consisting of:

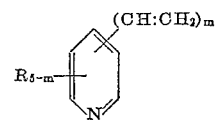

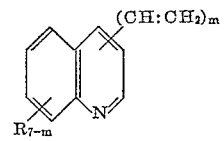

and

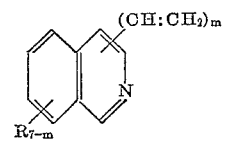

where $m$ is a numeral ranging from 1 to 2, and where R is a member selected from the group consisting of H and a lower alkyl group, and as a stabilizing agent therefor a sulphonphthalein having the structural formula:

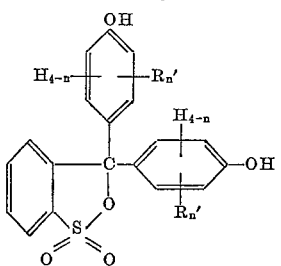

where R' is a substituent selected from the group consisting of nitro, halo, hydroxyl, amino, cyano, and sulpho, and $n$ is a numeral ranging from 0 to 4, inclusive.

6. A composition according to claim 5 wherein said polymerizable heterocyclic compound is 2-methyl-5-vinyl-pyridine.

7. A composition according to claim 5 wherein said polymerizable heterocyclic compound is 2-vinyl-pyridine.

8. A composition according to claim 5 wherein said stabilizing agent is phenosulphonphthalein.

9. A composition according to claim 8 wherein said stabilizing agent is present in an amount from 0.001% to 5% by weight.

References Cited in the file of this patent
UNITED STATES PATENTS

| | | |
|---|---|---|
| 2,824,105 | Smith et al. | Feb. 18, 1958 |
| 2,826,581 | Mahan et al. | Mar. 11, 1958 |